United States Patent [19]
Dickman

[11] Patent Number: 5,184,249
[45] Date of Patent: Feb. 2, 1993

[54] ELECTRIC KALEIDOSCOPE

[76] Inventor: Calvin H. Dickman, Rte. 4, Box 221, Harriman, Tenn. 37748

[21] Appl. No.: 802,828
[22] Filed: Dec. 6, 1991
[51] Int. Cl.$^5$ ............................................. G02B 23/00
[52] U.S. Cl. .................................................. 359/616
[58] Field of Search ............................... 359/616, 617

[56] References Cited

U.S. PATENT DOCUMENTS

| | | | |
|---|---|---|---|
| 2,727,426 | 12/1955 | Lopez | 359/617 |
| 3,020,796 | 2/1962 | Kaplan | 359/616 |
| 3,748,013 | 7/1973 | Orans | 359/617 |
| 3,953,104 | 4/1976 | Roitz et al. | 359/616 |

Primary Examiner—Richard A. Wintercorn
Attorney, Agent, or Firm—John P. Halvonik

[57] ABSTRACT

The invention relates to an improved electric kaleidoscope which uses an electric motor to provide a continuous, smooth turning operation to the end cap assembly of the kaleidoscope, thus eliminating the tiring, awkward and jerky manual turning of kaleidoscopes. The main tube of the kaleidoscope has a housing that contains the electric motor, switch and wiring to power and turning of the end cap assembly. The end cap assembly of the kaleidoscope is removeable as is the end cap assembly cover of the end cap assembly, thus providing an easy means of changing the various colors and shapes of viewing objects in the object space of the end cap assembly. The removeable end cap assembly cover, which can be screw-on, snap-on or push-on type, allows the operator to change the end cap lens by inserting a clear lens to view the immediate surroundings in a kaleidoscopic display, or inserting a somewhat opaque lens and view objects in the object space to view an infinite variety of internally generated images or designs. By using low voltage DC power and adaptors the kaleidoscope is totally mobile.

6 Claims, 1 Drawing Sheet

ELECTRIC KALEIDOSCOPE

BACKGROUND OF THE INVENTION

1. Field of the Invention

The invention relates to the field of kaleidoscopes and in particular to an electric powered kaleidoscope that uses an electric motor to turn or rotate an end cap assembly. The kaleidoscope has a removable end cap assembly and end cap assembly cover allowing the operator to easily change the viewing objects in the object space providing an infinite variety of kaleidoscopic views or images, or remove the viewing objects and insert a clear end cap lens and view the surroundings in a kaleidoscopic display. While there are other kaleidoscopes that use electric power, the applicant is unaware of any of the same construction.

2. Description of the Prior Art

While there are electric kaleidoscopes that are known, none that applicant is aware of are of the same construction as his.

SUMMARY OF THE INVENTION

The electric kaleidoscope of applicant's invention comprises a standard kaleidoscope viewing tube having a viewing piece and a set of three mirrors arranged so that one may view the images formed by rotation of the end cap assembly. The kaleidoscope also includes a housing that goes substantially around the center of the viewing tube that holds the motor that turns the end cap assembly (or the motor assembly can be attached to the tube). The motor of the kaleidoscope can drive or rotate the end cap assembly by means of a belt, gear or friction drive. The belt drive is depicted to show the basic operation of the kaleidoscope. The motor with a pulley and a belt that goes around the end cap assembly in some type of belt channel or containment, so that the rotating belt will not tend to cause the end cap assembly to creep or move to the far end of the main tube, drives or rotates the end cap assembly. The motor, belt drive arrangement would be enclosed in the housing that goes around viewing tube of the kaleidoscope. By use of a simple on-off switch, preferably spring loaded to off, even small children can operate the electric kaleidoscope. Unsupervised use of the electric kaleidoscope by small children when adaptor is plugged into household power outlet is not recommended.

It is the object of this invention to provide a kaleidoscope that uses an electric motor to turn or rotate the end cap assembly of said kaleidoscope, thus providing easy, smooth operation and continuous, infinite variety of scenes or images for entertainment of the operator without the tiring, awkward and jerky manual turning of the kaleidoscope or end assembly, a kaleidoscope that can be used and enjoyed day or night, anywhere, and anytime.

Another objective is to provide easy, quick access to the object space so the operator can change the various colored and shaped view objects to generate different types of color schemes and design shapes to an infinite degree.

Another objective is to provide a viewing hole in the eye piece of sufficient size so the operator will not have to strain and squint to see the scenery through the hole. The hole should be as large as possible without encompassing the internal edges of the internal mirrors. For the larger models allowing the viewer to use both eyes, the two viewing holes should be as large as possible appropriately spaced, but should not encompass the inside edges of the internal mirrors.

Another objective of the invention is to provide a kaleidoscope that can be used with an empty object space and a clear end cap lens to view immediate surroundings in kaleidoscopic display.

Another objective is to provide an electric kaleidoscope that will not present heating and electrical problems.

Another objective is to provide a kaleidoscope that can use alternate sources of electric power. Use of 115 volt AC to power the kaleidoscope motor is not recommended except possibly for sophisticated "adult use only" models. Use of low voltage DC power from a battery pack, auto cigarette lighter sockets, or from household electric sockets by use of appropriate adaptors is the preferred power supply for the kaleidoscope. Thus, it can be totally mobile and enjoyed anywhere, anytime, safely.

Another objective is to provide a kaleidoscope that, with appropriate adaptor lenses, the continuous, smooth and infinite kaleidoscopic displays of color schemes and designs can be recorded by video camera or other cameras on tape, compact discs or film and can be played back on televisions, projection screens, etc. for enjoyment, study and analysis. Thus, the operator can instantly stop the scene, rewind or fast forward as desired.

Other advantages of the invention should be readily apparent to those skilled in the art once the invention has been described.

Figure 1:
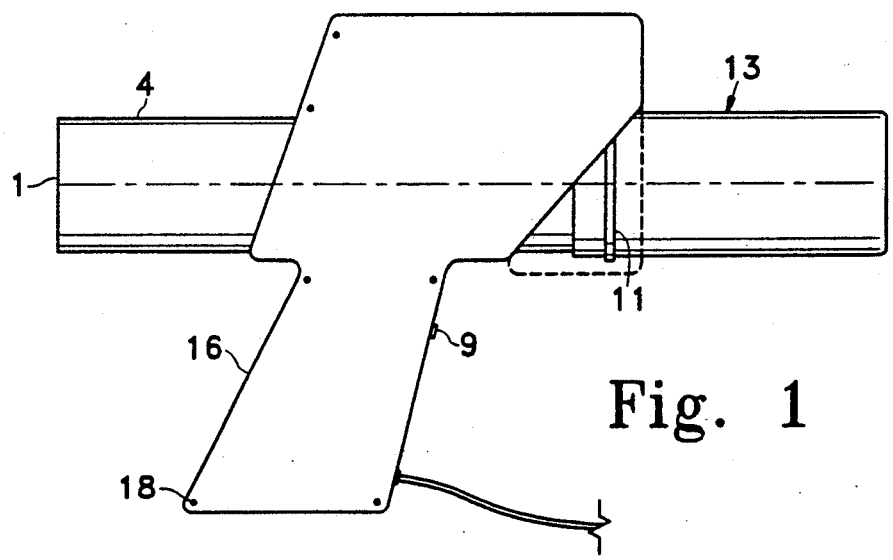
FIG. 1 shows the overall construction of the kaleidoscope.
Figure 2:
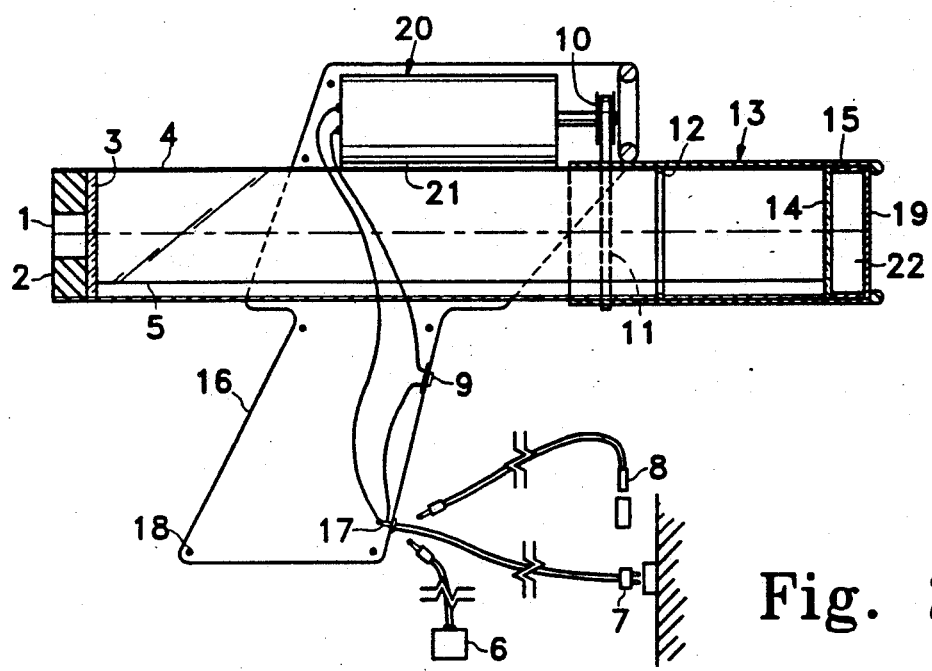
FIG. 2 shows kaleidoscope with alternate adapters.
Figure 3:
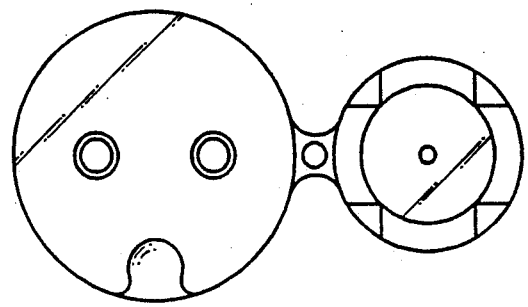
FIG. 3 shows means for viewing with both eyes.

DESCRIPTION OF THE NUMBERED ELEMENTS IN THE DRAWINGS 1. viewing hole
2. eye piece
3. clear lens
4. kaleidoscope tube
5. 3 long mirrors
6. battery pack
7. AC to DC wall adaptor
8. Cigarette lighter adapter
9. On/Of switch
10. Pulley
11. Drive Belt
12. End cap retainer ring
13. End cap
14. Objective lens (should be clear)
15. Spacer ring
16. Pistol grip and motor housing
17. Power receptacle
18. Structural screws
19. Opaque or cleat end cap lens
20. Electric Motor
21. Seat for the motor
22. Object space.
23. End Cap lens
24. Optional reflector assembly

DESCRIPTION OF THE PREFERRED EMBODIMENT

The kaleidoscope is built with an ordinary kaleidoscope viewing tube, i.e.: a tube that has a set of mirrors arranged parallel to each other to allow viewing colored and various shaped viewing objects in the object space with a kaleidoscopic effect. The outer housing surrounds the central portion of the viewing tube with a compartment that contains an electric motor that turns or rotates the end cap assembly.

The motor is in connection with a pulley and belt that goes around the end cap assembly and rotates said end cap assembly in relation to the viewing tube. The electric motor enables one to use and enjoy the kaleidoscope easily and for long periods.

At the end of the viewing tube is the viewing eye piece and at the other end is the end cap assembly. The eye piece may be an ordinary viewing piece suitable for the user's eye and the viewing hole should be as large as possible without encompassing the edges of the internal mirrors. The applicant's invention also contemplates using an eye piece with two apertures (one for each eye) and a removed portion or an indented area between the apertures for positioning such larger kaleidoscope over/on the bridge of the operator's nose.

The end cap assembly contains the various colored and shaped pieces of material in the viewing object space that produce the kaleidoscopic images. The end cap assembly has a removeable end cap lens that may be an opaque or clear lens. The opaque or somewhat opaque lens is normally used for kaleidoscope displays generated by the content of the object space. The clear lens would be used when the object space is emptied and the operator wants to view the surroundings in kaleidoscopic display. The end cap lens is held in place by the end cap assembly screw-on or push-on/snap-on cover. Inside the said assembly is the end cap spacer which assures the space for the viewing objects of various colors and shapes desired by the operator.

Moving along the assembly, the next piece is the clear objective lens which rests at end of the viewing tube and the internal mirrors and provides the other side of the object space. The order of the components of the end cap assembly starting at the end is the end cap assembly cover, end cap lens, spacer and this assembly fits over the end of the viewing tube so that the spacer rests on the objective lens without pressure which could interfere with the rotation of the end cap assembly. The end cap assembly cover is called a cover only because the screw-on or push-on unit encloses or contains the end cap lens and the apparatus covers the end of said assembly.

As the end cap assembly is turned by the electric motor and drive mechanism (belt, gear or friction) the assembly must be in a moveable connection with the viewing tube so that it can turn in relation to said tube. Toward this end, a retaining ring, as depicted (other mechanisms can be used), is placed substantially around the viewing tube in a groove corresponding to a groove on the inside of the end cap assembly. This allows the end cap assembly to turn in relation to the viewing tube and prevents the possible creeping of the end cap assembly from its proper position.

The design of the motor pulley and the belt track on the end cap assembly could be such that the belt being restricted to its track around the end cap assembly will prevent such creeping. Whichever of the drive train design is used, as the electric motor rotates the end cap assembly causing the viewing objects in the object space to move giving the kaleidoscopic views to the operator.

The electric motor is held within a housing that goes substantially around a portion of the viewing tube. The housing is preferably placed at about the center of the tube. The housing has a channel for an electric motor with a pulley and a belt around the pulley and the end cap assembly if the belt drive connection is used. The housing will have the appropriate plug or socket to plug in the electric cords for operation of the kaleidoscope. The associated electric cord would or may have the necessary adaptor for operation from a battery pack, household power through an AC or DC adaptor, or automobile cigarette lighter sockets. Said housing containing the electric motor and substantially surrounding the viewing tube may come in a pistol grip form for ease of holding, viewing and operation by the operator. The pistol grip would contain the on off switch.

The main tube comes in the standard construction of many kaleidoscopes. There are three mirrors arranged lengthwise down the tube so that they form a triangular shape when viewed in cross section, i.e.: looking down the tube. This enables the shapes and colors of the material in the viewing object space to assume the typical kaleidoscopic patterns one is familiar with.

The motor housing or main tube may contain a bracket on which an extension with wiring, flashlight bulb type socket and a flashlight reflector which can be easily attached so the operator can enjoy the kaleidoscope during non-daylight hours. The extension apparatus contacts would coincide with electric contacts on housing.

The design of the belt, gear, or friction drive of the end cap assembly may be such that the connection between the motor and the end cap assembly would prevent possible end cap assembly creeping thus eliminating the need for the retainer ring mechanism. The design of the kaleidoscope may be such that the electric motor and wiring assembly would be a separate assembly and could be attached to the viewing tube by glue, screws, clamp mechanism, or other simple means. The end cap assembly is readily removeable as is its cover to facilitate changing the material in object space.

I claim:

1. An electric powered kaleidoscope for allowing a viewer to view kaleidoscopic images of objects comprising: viewing tube having front and rear ends and inner walls, mirrors in connection with said inner walls for forming and reflecting said images to said viewer, eyepiece means for allowing the passage of light in connection with said rear of said tube, objective lens at said front of said tube, end cap assembly in rotatable connection with said front end of said tube, said end cap assembly having an interior space for placing objects for viewing and having an end cap lens located at the front of said end cap assembly, motor housing attached to said viewing tube and having an electric motor, said electric motor in mechanical connection with said end cap assembly so that the operation of said electric motor rotates said end cap assembly, said kaleidoscope having an on-off electric power switch, a detachable light and reflector assembly to provide artificial light when needed to view said images.

2. The apparatus of claim 1 wherein said eyepiece means has left and right viewing apertures for the eyes of said viewer, and having a removed portion between said right and left apertures, said removed portion for accommodating the nose of said viewer.

3. The apparatus of claim 1 having an adaptor means for electrically connecting said motor to a cigarette lighter power socket of an automobile.

4. The apparatus of claim 1 having an adaptor means for converting alternating electric current to direct, low voltage electric current and supplying said motor with said direct low voltage current.

5. The apparatus of claim 1 having an adapter means for electrically connecting said motor to a dry cell battery pack.

6. The apparatus of claim 1 having a detachable light and reflector in connection with said light, said reflector having means for directing light onto said end cap lens so that said apparatus can be used during periods of little natural light.

* * * * *

UNITED STATES PATENT AND TRADEMARK OFFICE
CERTIFICATE OF CORRECTION

PATENT NO. : 5,184,249

DATED : Feb. 2, 1993

INVENTOR(S) : Calvin H. Dickman

It is certified that error appears in the above-indentified patent and that said Letters Patent is hereby corrected as shown below:

The term "opaque" and phrase "somewhat opaque" are replaced as indicated below:

"Abstract", 5th line from the end change " somewhat opaque" to read " translucent".

Column 2, line 62, "Description Of The Numbered Elements In The Drawings" change item 19 to read:

" 19. Translucent or clear end cap lens"

"Description Of The Preferred Embodiment", column 3, change lines 31 and 32 to read:

" a translucent or clear lens. The translucent lens is normally used -------------displays"

Signed and Sealed this

Eighth Day of November, 1994

Attest:

BRUCE LEHMAN

Attesting Officer    Commissioner of Patents and Trademarks